United States Patent [19]
Yoshida

[11] Patent Number: 5,237,473
[45] Date of Patent: Aug. 17, 1993

[54] MAGNETIC DISK DRIVE COMPRISING A DISK CARTRIDGE AND A DRIVING DEVICE WHICH MAGNETIC DISK DRIVE HAS AN EJECT MECHANISM FOR SOFTLY EJECTING THE DISK CARTRIDGE FROM THE DRIVING DEVICE

[75] Inventor: Kobun Yoshida, Sayama, Japan
[73] Assignee: Teac Corporation, Tokyo, Japan
[21] Appl. No.: 942,102
[22] Filed: Sep. 8, 1992

Related U.S. Application Data
[63] Continuation of Ser. No. 615,881, Nov. 20, 1990, abandoned.

[30] Foreign Application Priority Data
Nov. 22, 1989 [JP] Japan ................... 1-303862

[51] Int. Cl.$^5$ ............................................. G11B 17/02
[52] U.S. Cl. .............................. 360/99.06; 360/97.02
[58] Field of Search ............... 360/99.02, 99.03, 99.06, 360/99.07; 369/270, 75.2

[56] References Cited
U.S. PATENT DOCUMENTS

| 4,864,440 | 9/1989 | Satoh et al. ............ 360/99.02 |
| 4,945,433 | 7/1990 | Suzuki et al. .......... 360/99.02 |
| 4,975,805 | 12/1990 | Schmutzler ............ 360/99.02 |
| 5,025,339 | 6/1991 | Kanno et al. .......... 360/99.02 |

FOREIGN PATENT DOCUMENTS
77208831 9/1989 Taiwan .
118241B 7/1991 Taiwan .

Primary Examiner—Robert S. Tupper
Attorney, Agent, or Firm—Michael N. Meller

[57] ABSTRACT

A magnetic disk drive has an ejecting mechanism for ejecting a disk inserted into the magnetic disk drive. The ejecting mechanism has an eject button, a touching member, and a communicating member. The communicating member is coupled to the touching member at one end thereof and coupled to the eject button at the other end thereof. The touching member touches the disk which is inserted into the magnetic disk drive. The communicating member can communicate a force proportional to a force by which the eject button is pushed to a touching member. Therefore when the eject button is pushed gradually, the touching member ejects the disk gradually. The present invention is particularly applicable to a magnetic disk drive having a disk cartridge and a driving device. The disk cartridge has a magnetic disk and a magnetic head therein, but no current supply source to drive them and no controller to control the driving of them. The driving device has the current supply source and/or the controller. Accordingly, even when the disk cartridge is ejected by the ejecting mechanism from the driving device, the magnetic disk and the magnetic head do not collide with each other.

9 Claims, 14 Drawing Sheets

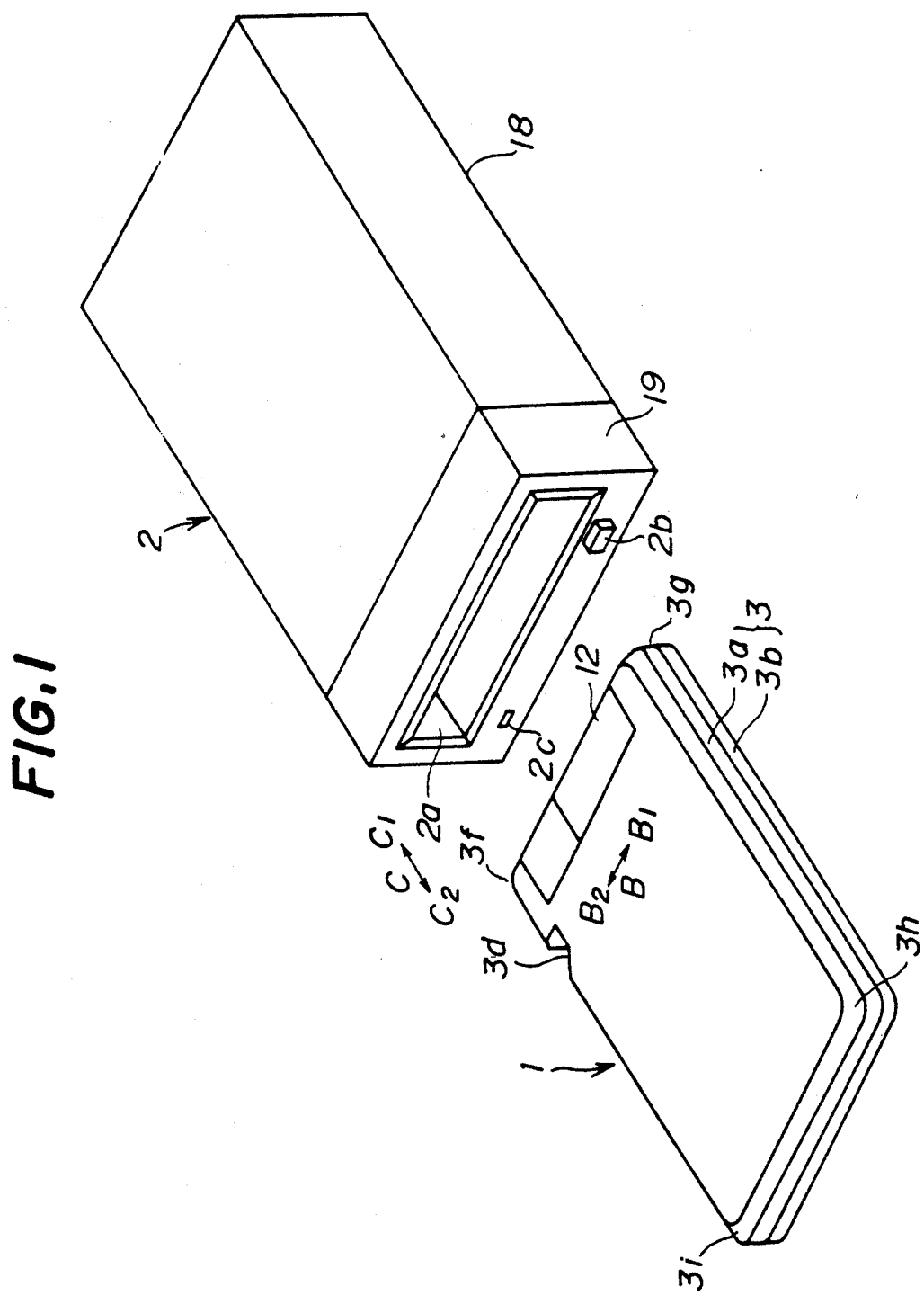

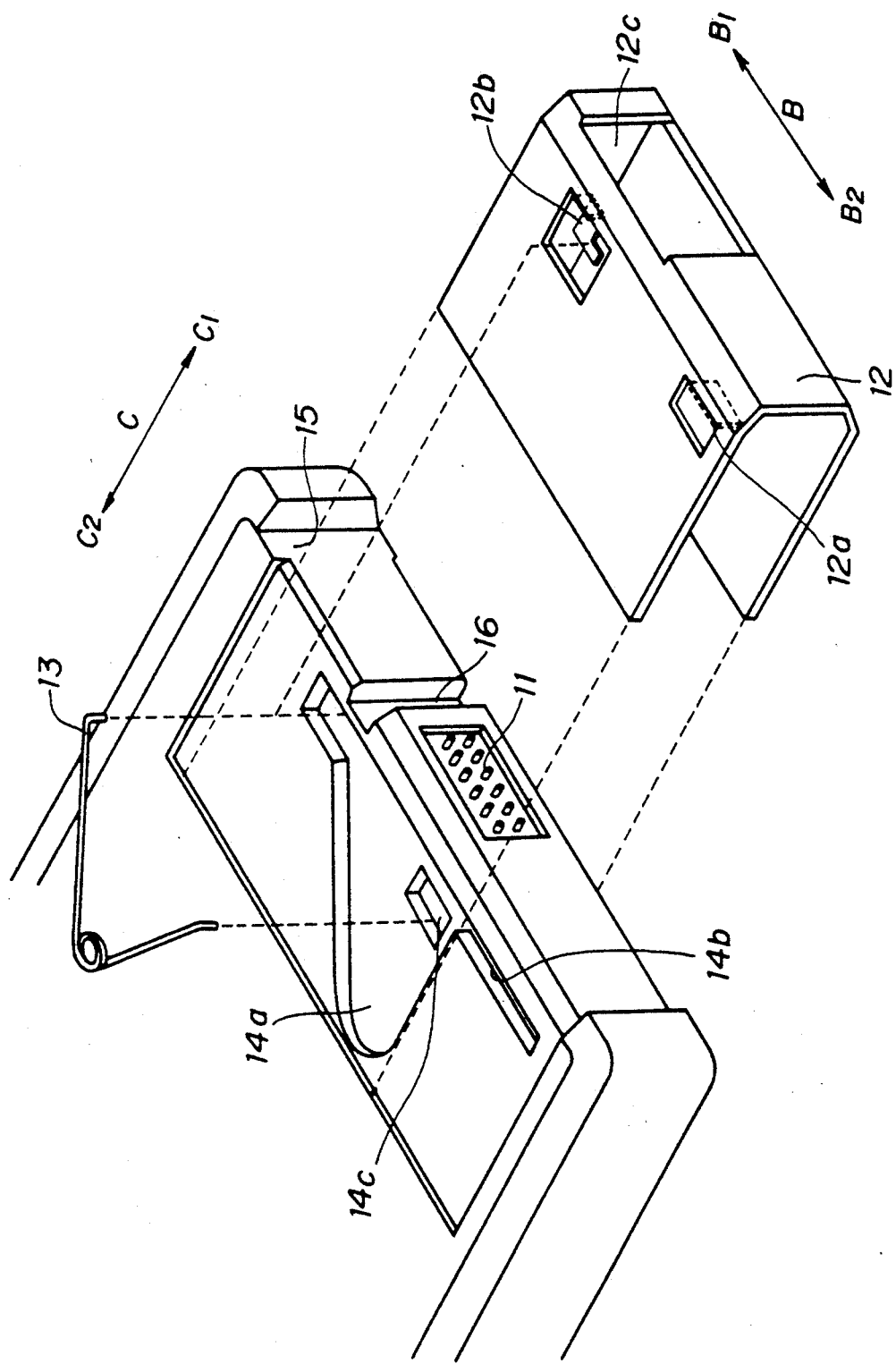

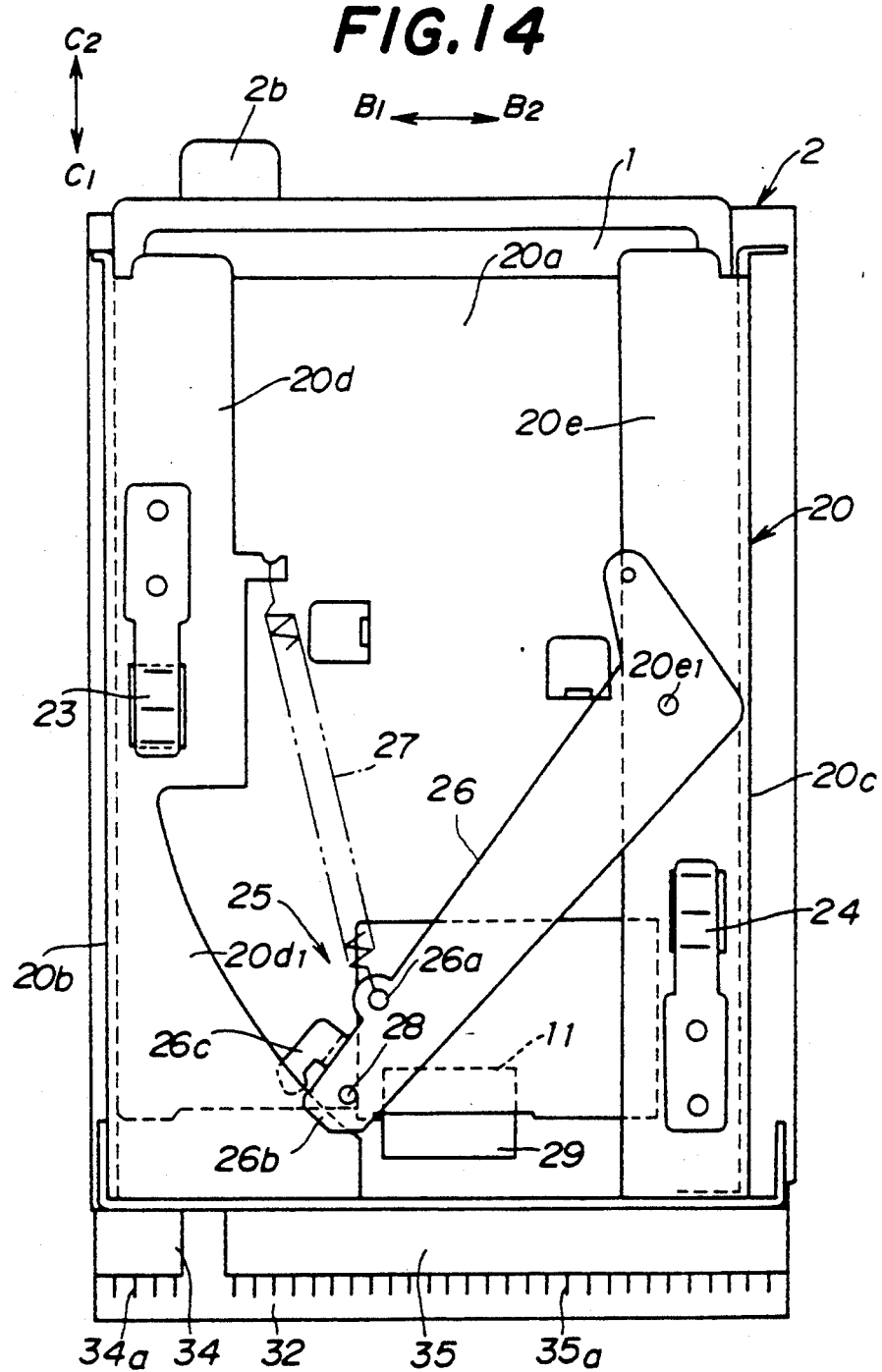

MAGNETIC DISK DRIVE COMPRISING A DISK CARTRIDGE AND A DRIVING DEVICE WHICH MAGNETIC DISK DRIVE HAS AN EJECT MECHANISM FOR SOFTLY EJECTING THE DISK CARTRIDGE FROM THE DRIVING DEVICE

This application is a continuation of application Ser. No. 615,881, filed Nov. 20, 1990, now abandoned.

BACKGROUND OF THE INVENTION

The present invention relates generally to magnetic disk drives in which a disk is inserted, and more particularly to a magnetic disk drive having an ejecting mechanism for ejecting a disk loaded at a predetermined position.

Among magnetic disk drives, hard disk drives have been used as memory means for computers. Hard disks have undergone more improvements in the areas of tracks per inch (TPI) and bits per inch (BPI) than so called floppy disks, thus making it possible for hard disks to be recorded with a high density. The hard disk is fixed in a sealed-up housing to prevent dust from the outside attaching itself thereto so that it can be recorded with high density.

Consequently, information recorded on the hard disk cannot be used generally except in a computer which includes the hard disk drive. And when the hard disk is overflown, as the disk cannot be easily exchanged, it is troublesome to exchange the hard disk drive itself.

Accordingly, this applicant has developed a disk drive comprising a disk cartridge and a driving device. The term "a disk cartridge", as used herein, means an apparatus which comprises at least a disk and a head in a sealed case, but has no current supply source to drive them and has no controller to control them. The term "a driving device", as used herein, means an apparatus has the current supply source and/or the controller. The disk cartridge can be easily connected and disconnected with the driving device. The driving device may be connected to an external computer, such as a host computer, and the disk cartridge can be driven and controlled by the driving device and/or the external computer. Therefore the disk cartridge may be considered as being an easily exchangable hard disk.

A conventional magnetic disk drive using a floppy disk has a following ejecting mechanism. The disk is loaded into a holder. The holder can usually move from a first position at which the disk is inserted or ejected to a second position at which information is recorded on the disk and/or reproduced therefrom. After the disk is inserted into the holder, the holder moves to a second position so as to be held by a holding member. The holding member can move from a third position at which it holds the holder to a fourth position at which it remains after the holding member is released from holding the holder. When the holding member is released, the holder is moved from the fourth position to the third position by an elastic force of a first spring. Accordingly, the holder is moved from the second position to the first position by an elastic force of a second spring. When the disk is ejected, an eject button, which is usually mounted on a front surface of the disk drive, is pushed to release the holding member from holding. While the holding member moves from the third position to the fourth position, the holding member repulses the disk in an ejecting direction by means of a repulsive force of the first spring. Consequently, the holder moves from the second position to the first position, and thus the disk forcibly springs out from the holder.

But when an attempt is made to apply the above-mentioned ejecting mechanism to the magnetic disk drive comprising the disk cartridge and the driving device, since the disk cartridge having a magnetic disk and a magnetic head is forcibly ejected, the disk and the head collide with each other so that either or both get damaged.

SUMMARY OF THE INVENTION

Accordingly, it is a general object of the present invention to provide a novel and useful magnetic disk drive in which the problems described above are eliminated.

Another object of the present invention is to provide a magnetic disk drive comprising a disk cartridge and a driving device, wherein the magnetic disk drive has a ejecting mechanism for ejecting the disk cartridge from the driving device without any damage to the magnetic disk and the magnetic head.

Another more specific object of the present invention is to provide a magnetic disk drive which comprises a disk cartridge, and a driving device, wherein the disk cartridge comprises a magnetic disk, and a magnetic head for recording information on the magnetic disk and/or reproducing information therefrom, and wherein the driving device comprises a housing, a holder, mounted in the housing, which the disk cartridge is inserted into and ejected from, a current supply source for supplying electricity to the disk cartridge in order to drive the magnetic disk and the magnetic head when the disk cartridge is inserted into the holder, a touching member slidably provided in the holder to be slid between a first position and a second position, the touching member being at the first position before the disk cartridge is inserted, being at the second position after the disk cartridge is completely inserted, and being at the first position after the disk cartridge is ejected completely, an eject button mounted on a surface of the housing, and a communicating member, coupled with the touching member at one end thereof and coupled with the eject button at the other end thereof, for communicating a force proportional to a force for pushing the eject button to the touching member, when the disk cartridge is inserted completely into the holder, in order to to move the touching member from the second position to the first position so that the disk cartridge is ejected from the holder, the disk cartridge being ejected softly when the eject button is pushed softly so that the magnetic disk and the magnetic head do not collide with each other.

Other objects and further features of the present invention will be apparent from the following detailed description when read in conjunction with the accompanying drawings.

BRIEF DESCRIPTION OF THE DRAWINGS

FIG. 1 is a perspective view of a magnetic disk drive according to the present invention;

FIG. 4(A), FIG. 4(B) and FIG. 4(C) are respectively a plane view, a cross-sectional view and a perspective view for explaining the operation of the shutter;

FIG. 14 is a cross-sectional view for explaining the on-off shutter mechanism;

DESCRIPTION OF PREFERRED EMBODIMENTS

A detailed description will now be given of a magnetic disk drive according to the present invention. Referring to FIG. 1, the magnetic disk drive comprises a disk cartridge 1 and a driving device 2. The driving device 2 supplies electric power to the disk cartridge 1 to drive it while the disk cartridge 1 is inserted into the driving device 2 from a frontal insert entrance 2a. The disk cartridge 1 can be easily inserted into and ejected from the driving device 2, and it is to be inserted only when it is used like a floppy disk. A plurality of disk cartridges with different memory capacities may be prepared, and one of them may be selected depending upon the kind or amount of information.

The driving device 2 is connected to an external computer (not shown). Therefore it is possible to transfer the information easily from the computer to the disk cartridge 1.

Figure 2A:
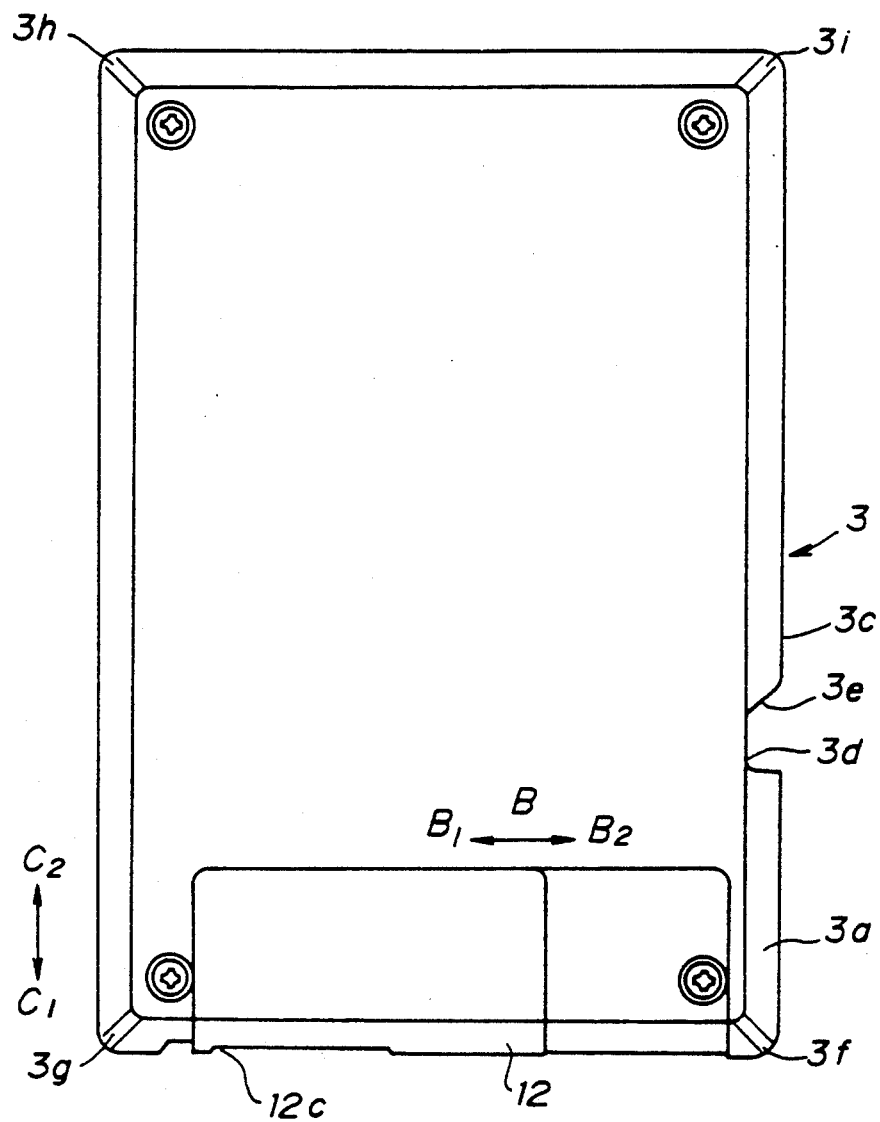
FIG. 2(A) and FIG. 2(B) are respectively a plane view and a front view of a disk cartridge shown in FIG. 1.
Figure 2B:
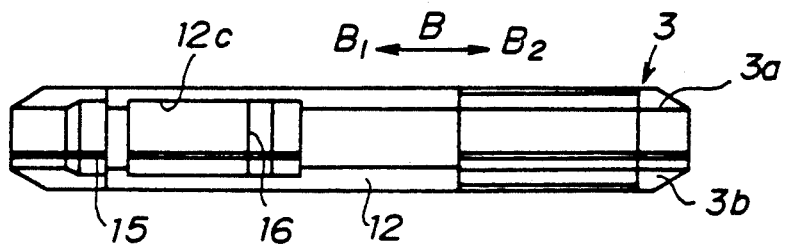
Figure 3A:
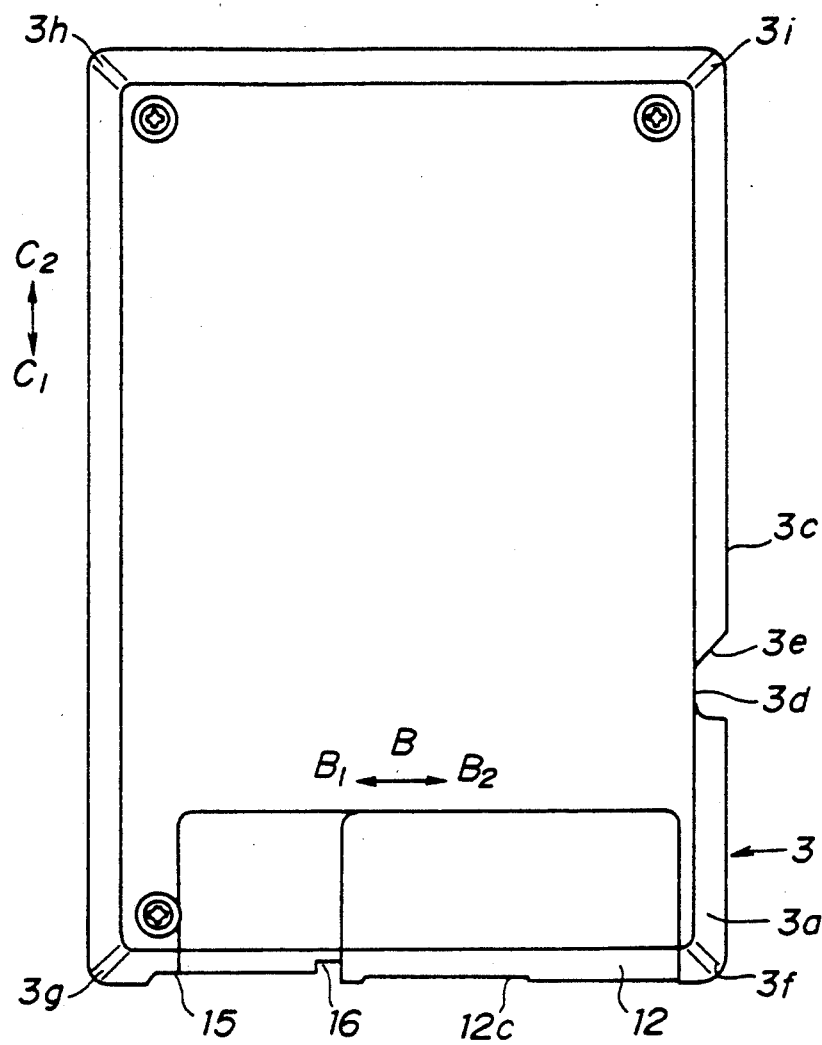
FIG. 3(A) and FIG. 3(B) are respectively a plane view and a front view of the disk cartridge when a shutter opens.
Figure 3B:
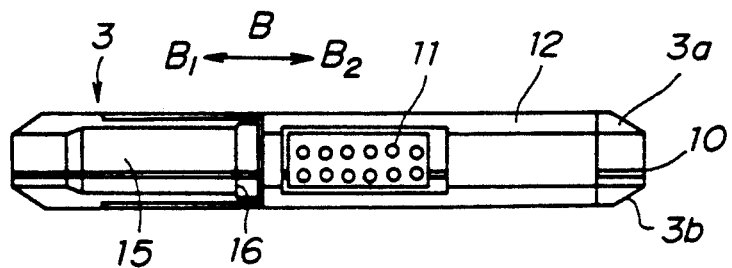
Figure 4A:
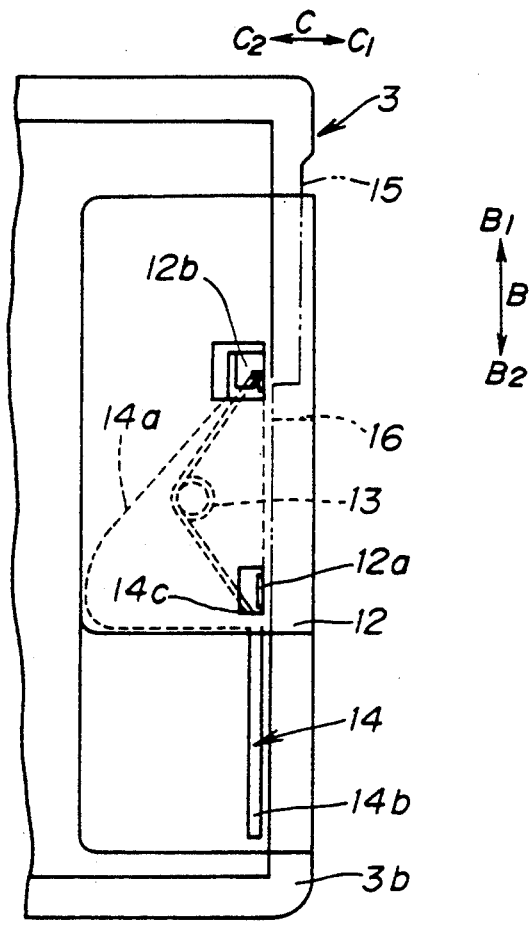
Figure 4B:
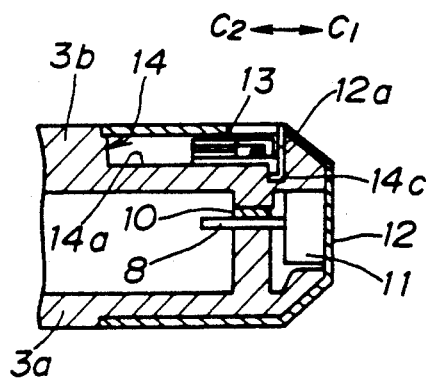

In this embodiment, the disk cartridge 1 has a single hard disk, however, needless to say, the present invention can be applied to a plurality of disks. As shown in FIG.1 and FIG.2, the disk cartridge 1 is enclosed in a sealed-up case 3 to prevent dust from attaching itself thereto. As shown in FIG.4(B), the case 3 comprises an upper case 3a and a lower case 3b, and located in the junction between them is an elastic member 10 which keeps the case 3 airtight. The electric power is supplied from the driving device 2 to the disk cartridge 1 via a connector 11. The connector 11 is connected with a junction 8b of a flexible printed circuit board 8, and the electric power is supplied to every part of the disk cartridge 1 via the flexible printed circuit board 8.

Figure 5:
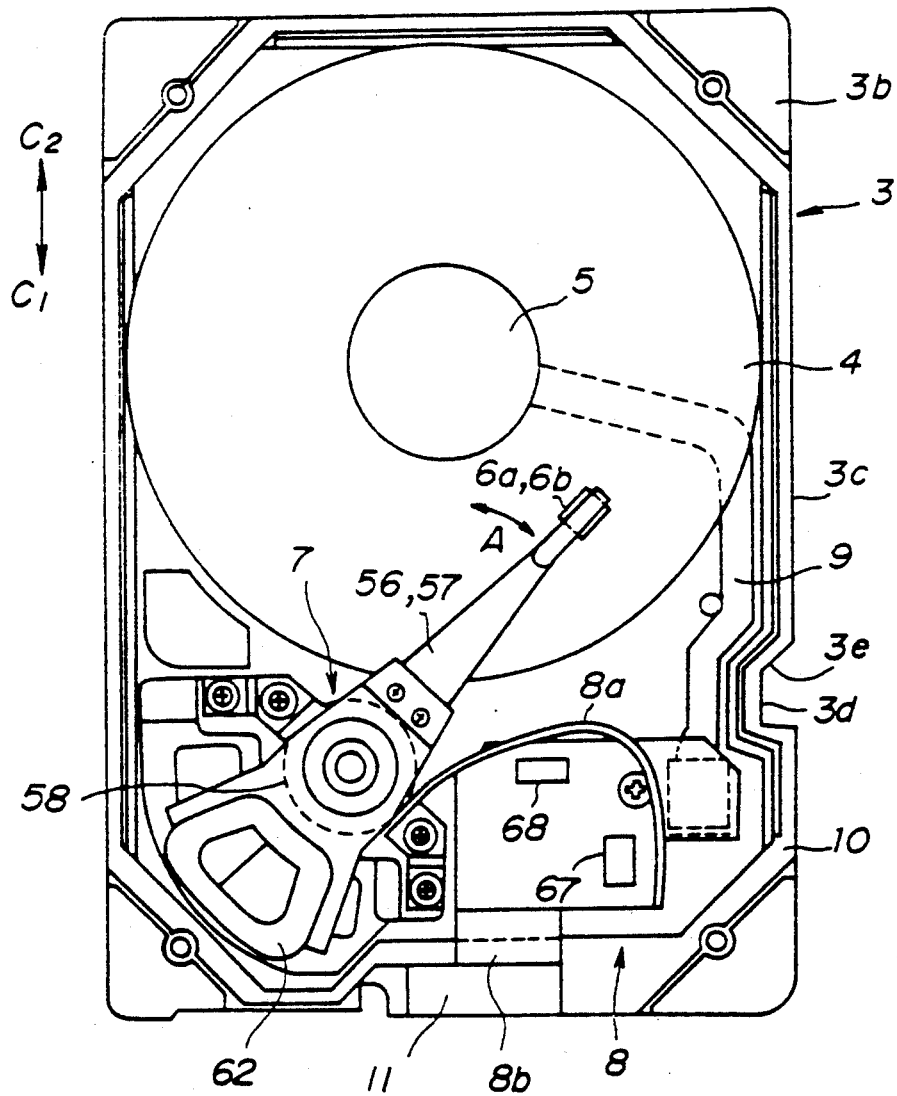
FIG. 5 is a plane view of the disk cartridge without an upper case.
Figure 6:
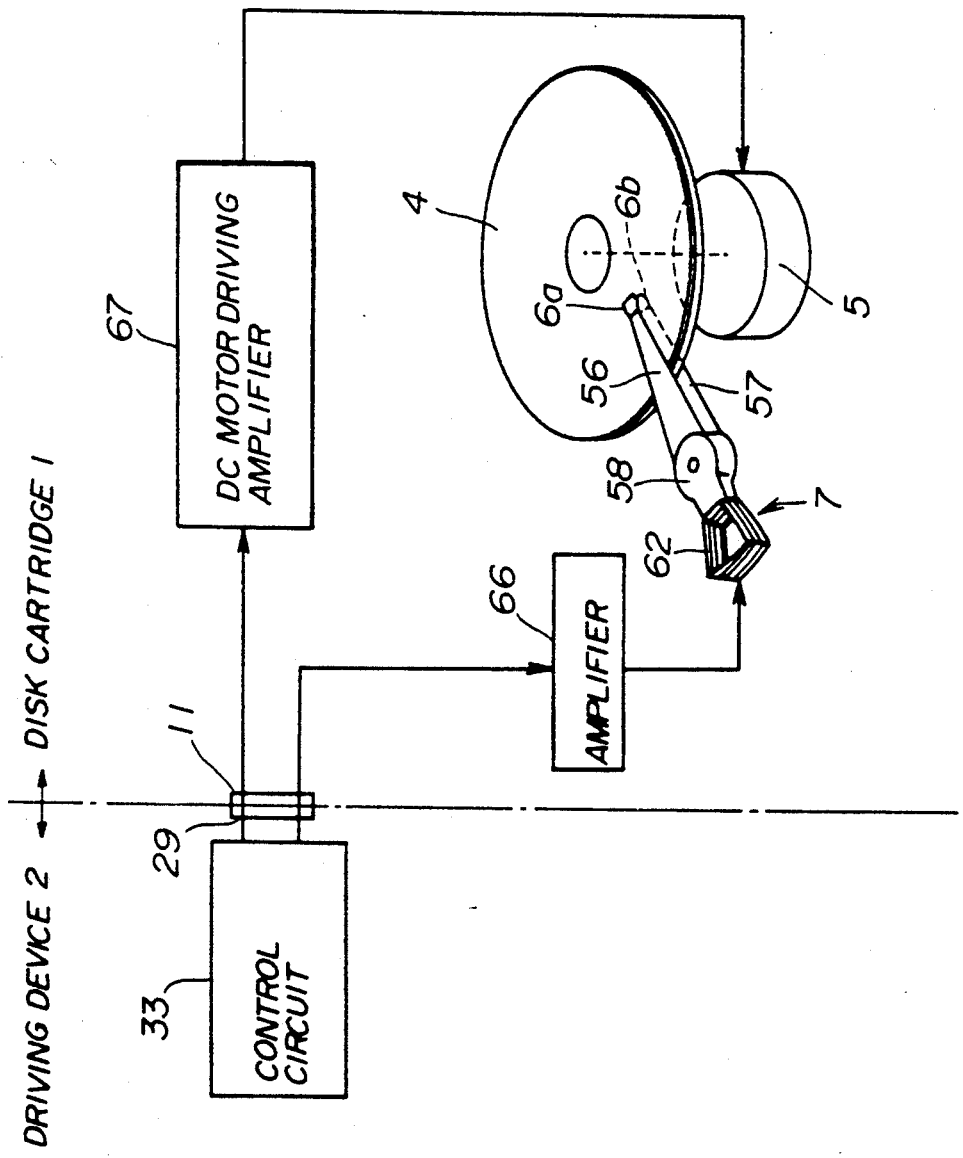
FIG. 6 is a system block diagram showing a general circuit arrangement which drives an actuator and a motor.

The disk cartridge 1 comprises a magnetic disk 4, a spindle motor 5 to rotate the disk 4, magnetic heads 6a and 6b, a pair of head arms 56 and 57 with magnetic heads 6a and 6b at the tops thereof, and an actuator 7 for swinging the head arms 56 and 57. The disk cartridge 1 has a disk rotating mechanism for rotating the disk 4 when it is recorded or reproduced. As shown in FIG. 5 and FIG. 6, the disk rotating mechanism comprises the spindle motor 5, a rotor (not shown), and a DC motor driving amplifier 68. The disk 4 is fixed around the rotor of the motor 5 and both rotate together. The rotating speed of the motor 5 is determined by the amplifier 68, and controlled by a control circuit 33. The electric power is supplied to the motor 5 by the flexible printed circuit board 8 via a junction code 9. The junction code 9 is pulled out via the side of the housing of the motor 5 and connected with the flexible printed circuit board 8.

Also the disk cartridge 1 has a head moving mechanism. The head moving mechanism is a mechanism for moving the heads 6a and 6b in an approximately radial direction of the disk 4, however, strictly speaking, it further includes a mechanism for moving the heads 6a and 6b from a recording position to a waiting position. The term "a recording position", as used herein, means a position of any one of the tracks on the disk 4. And the term "a waiting position", as used herein, means a position apart from the tracks on the disk 4. The head moving mechanism comprises magnetic heads 6a and 6b, head arms 56 and 57, an actuator 7 shown in FIG. 5, and an amplifier 67 shown in FIG.6. As shown in FIG. 5 and FIG. 6, the actuator 7 rotates in the direction A, and moves the heads 6a and 6b in the approximate radial direction of the disk 4. The actuator 7 rotates by means of a supporting member 58. The actuator 7 and the heads 6a and 6b are electrically connected with the junction 8b via a wire 8a of the flexible printed circuit board 8. When the driving coil 62 is energized, the supporting member 58 rotates and the heads 6a and 6b move approximately radially on the disk 4 on the basis of the Fleming's rule. Rotation of the actuator 7 is also controlled by the control circuit 33 shown in FIG. 6. After recording and/or reproducing, the head arms 56 and 57 rotate clockwise. Because the disk cartridge 1 of the present invention is easily ejected and carried, it is easily subject to vibration. Accordingly, the heads are held not at the most inner track on the disk, but at the waiting position so that they do not crash the disk.

Figure 7:
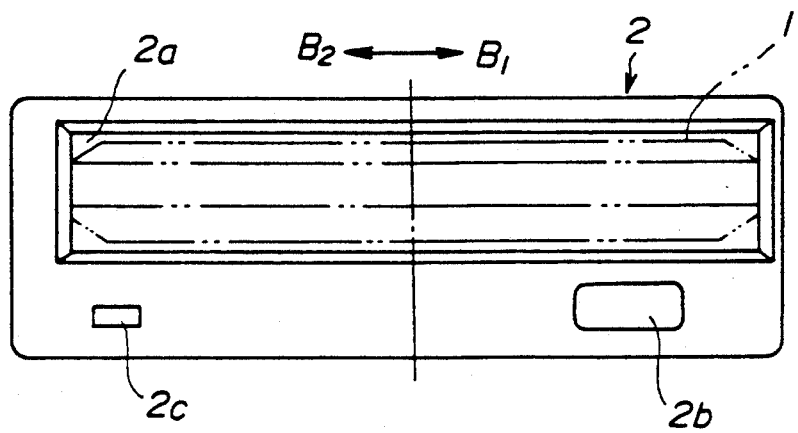
FIG. 7 is a front view of a driving device.

The driving device 2 has five mechanical mechanisms which cooperate with the disk cartridge 1, such as a loading mechanism, mis-insert preventing mechanism, on-off shutter mechanism, ejecting mechanism, and mis-eject preventing mechanism. A description will be given of the above five mechanical mechanisms. The driving device 2 has, as shown in FIG. 1 and FIG. 7, the insert entrance 2a, an eject button 2b and an indicator 2c at a frontal panel 19. The indicator 2c indicates the recording or reproducing of the disk cartridge 1.

Figure 9:
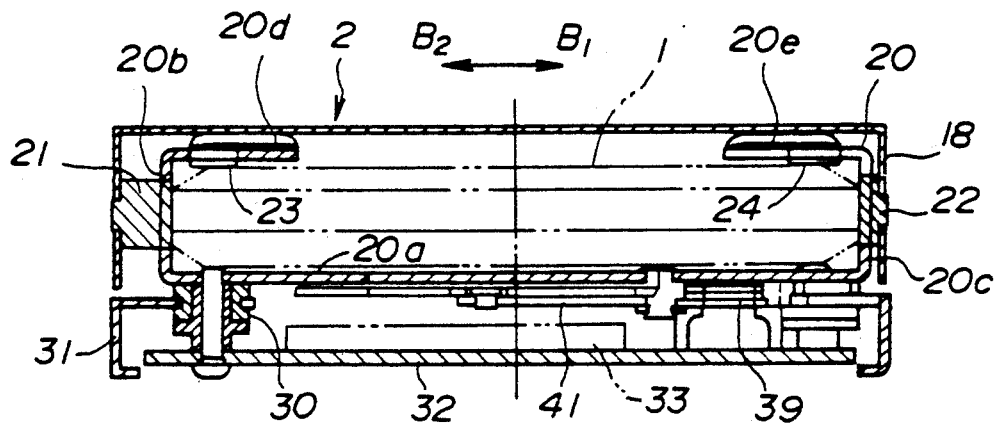
FIG. 9 is a cross-sectional view taken along line VIII—VIII shown in FIG. 12.
Figure 8:
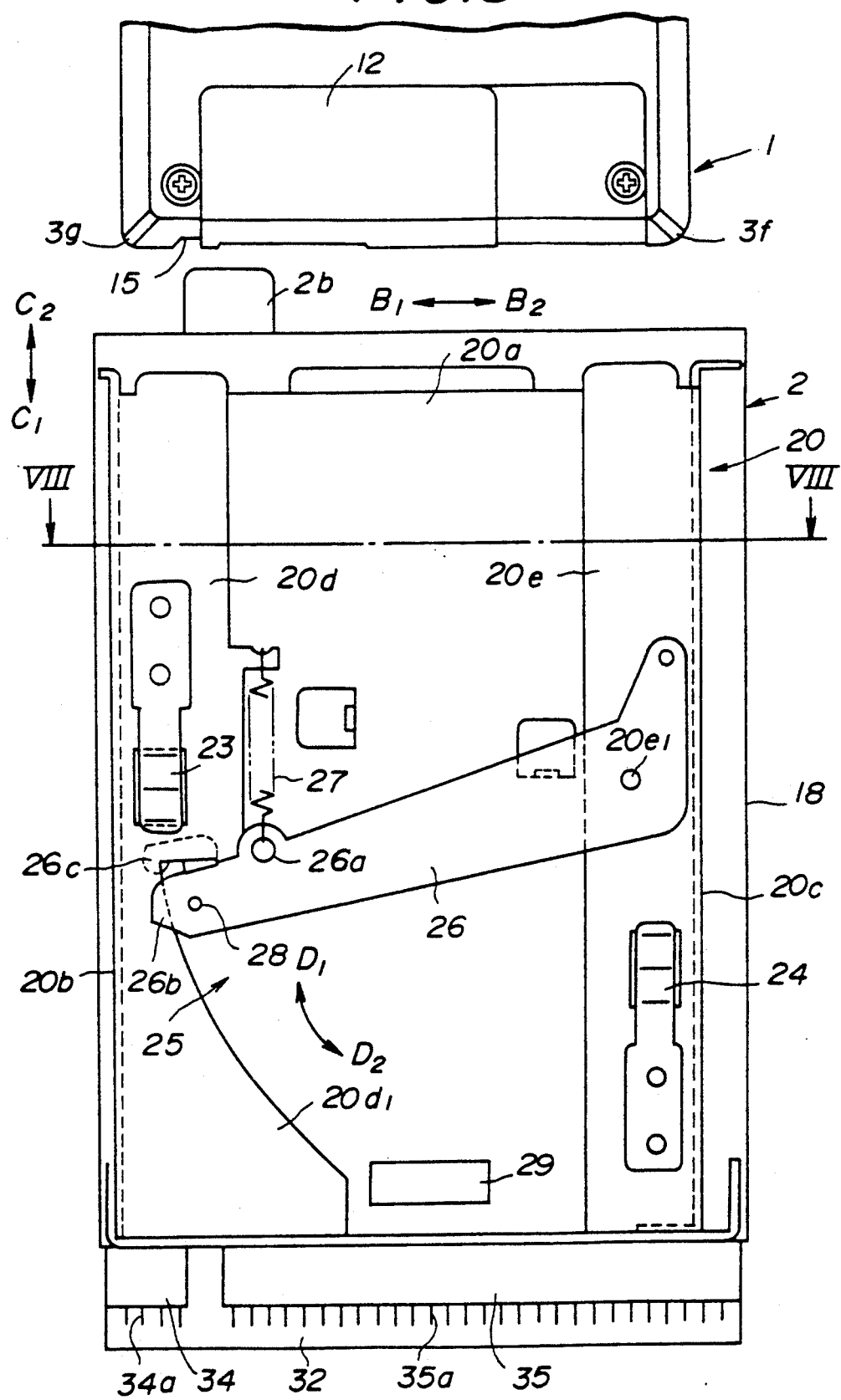
FIG. 8 is a plane view for explaining loading mechanism and on-off shutter mechanism.
Figure 13:
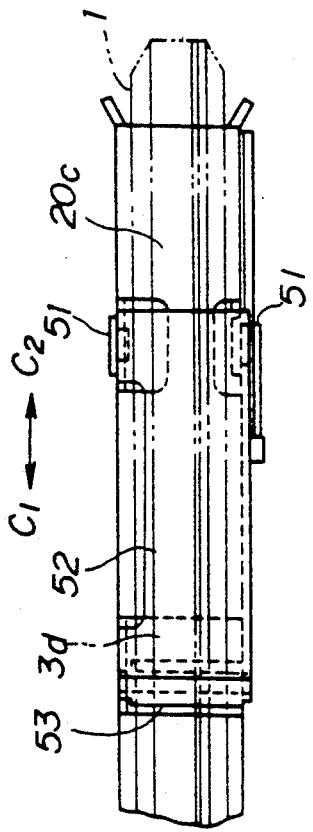
FIG. 13 is a side view of a mis-eject preventing mechanism.

First of all, the loading mechanism will be described below. The loading mechanism is a mechanism for loading the disk cartridge 1 inside the driving device 2 when the disk cartridge 1 is inserted in the correct direction via the insert entrance 2a. The loading mechanism comprises a holder 20. As shown in FIG. 8 and FIG. 9, the holder 20 is located inside a housing 18 of the driving device 2. The holder 20 comprises a base plate 20a, side plates 20b and 20c and crown plates 20d and 20e. The side plates 20b and 20c are bent upward from the base plate 20a. The crown plates 20d and 20e are bent respectively from the side plates 20b and 20c and are parallel and opposite to the base plate 20a. As shown in FIG. 13, both side plates 20b and 20c are fixed on the housing via supporting members 21 and 22. And the base plate 20a is fixed on the base 32 with a chassis 31 via a vibration absorbing member 30. The crown plates 20d and 20e respectively have flat springs 23 and 24 which compress and hold the disk cartridge 1 while it is inserted. Thus, if the disk cartridge 1 is inserted in the correct direction, it is held by the flat springs 23 and 24, and fixed inside the driving device 2. A connector 29 of the driving device 2 is connected with a connector 11 of the disk cartridge 1, and electric power is supplied by the driving device 2 to the disk cartridge 1 via the connectors 29 and 11. If an attempt is made to insert the disk cartridge 1 in the wrong direction, it is prevented from being inserted by the mis-insert preventing mechanism. And the shutter 12 which encloses the connector 11 is opened or closed by the on-off shutter mechanism.

Figure 11:
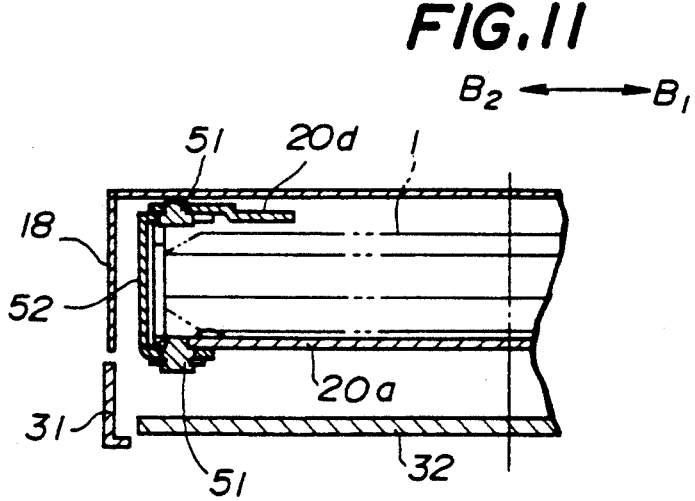
FIG. 11 is a front view taken along line X—X shown in FIG. 10.
Figure 10:
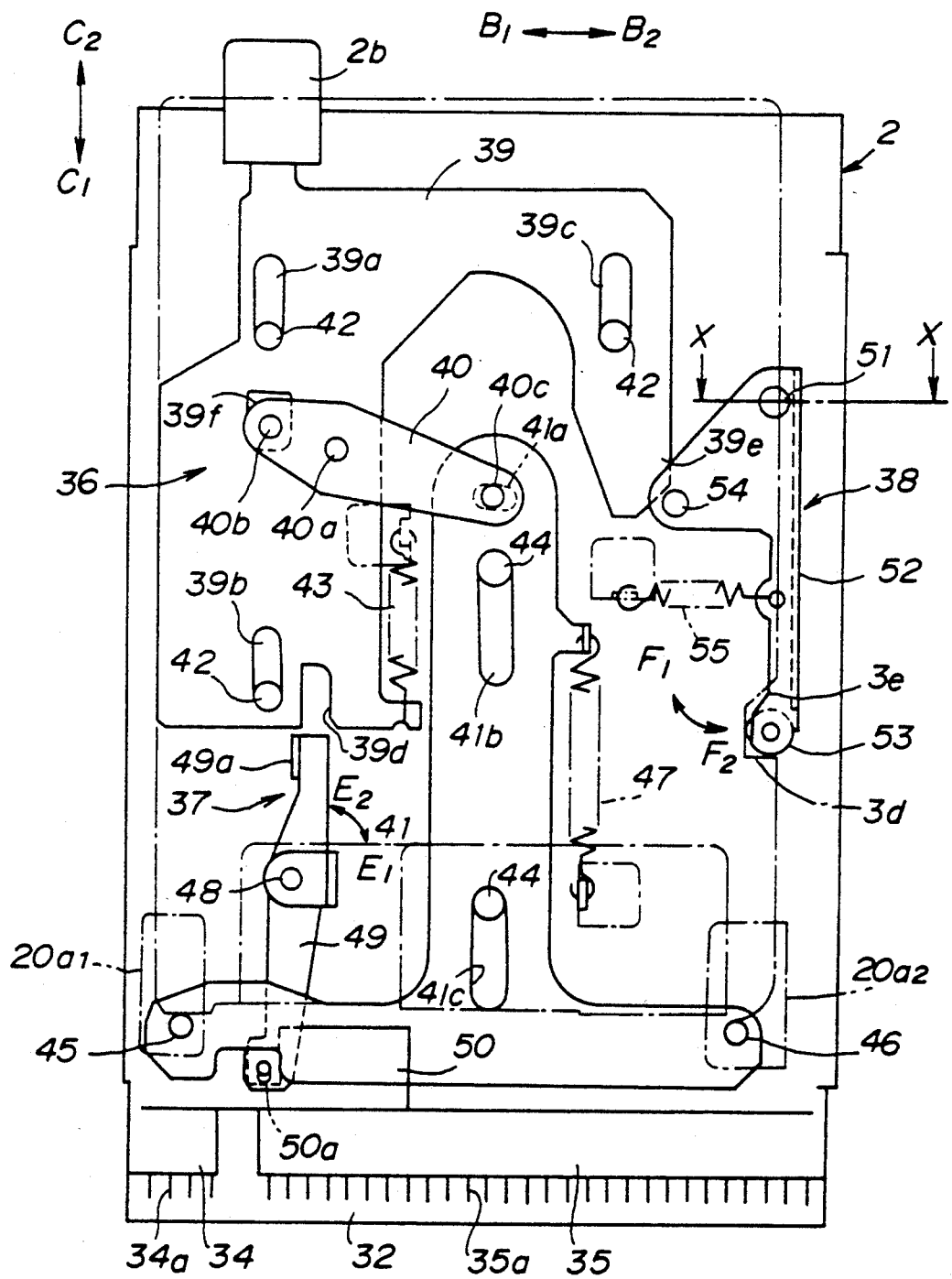
FIG. 10 is a plane view for explaining each mechanism in the driving device.
Figure 12:
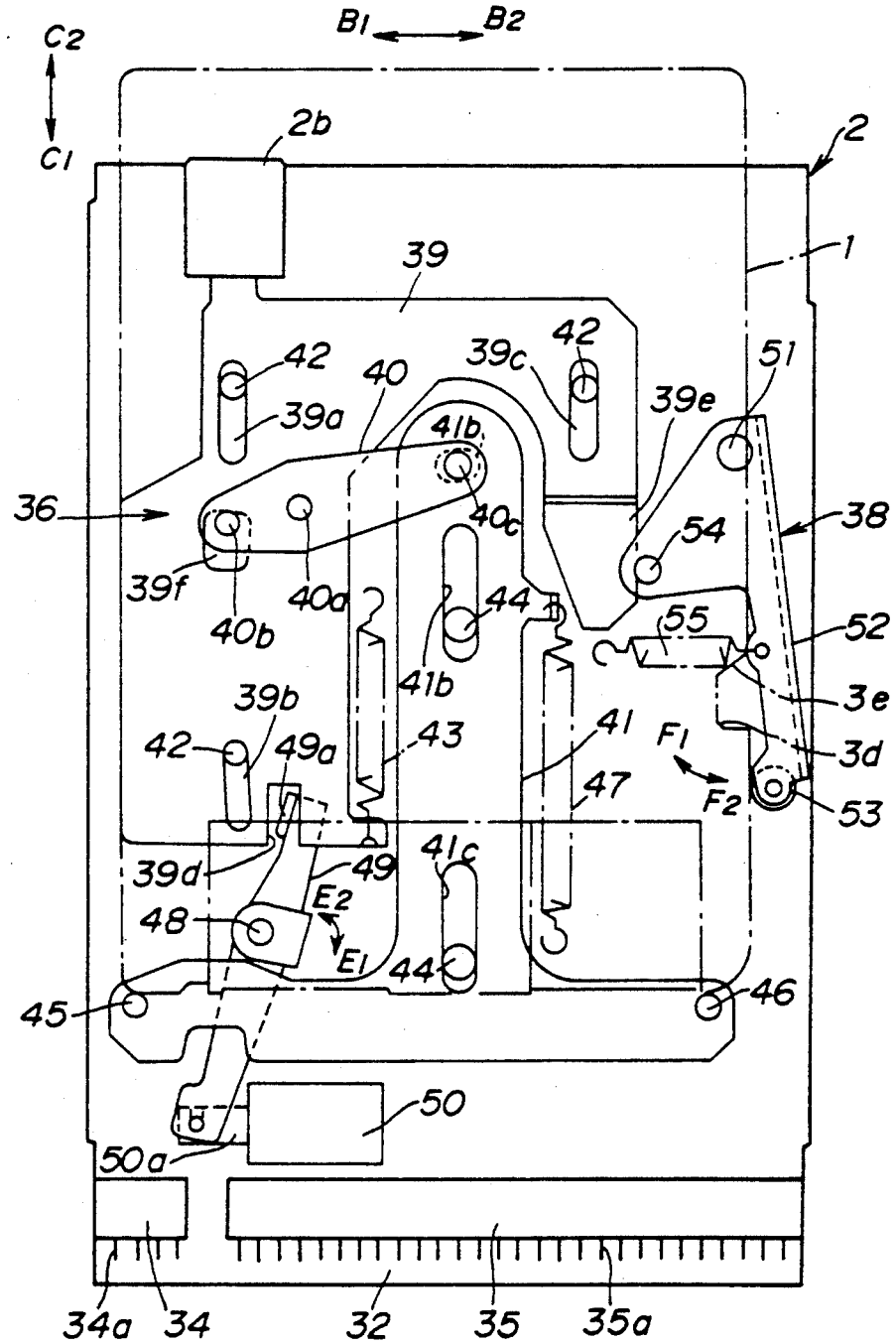
FIG. 12 is a plane view for explaining the ejecting operation.

The mis-insert preventing mechanism 38 is a mechanism 38 for allowing the disk cartridge 1 to be inserted in only the correct direction. A description will be given of the mis-insert preventing mechanism with reference to FIG.2 (A), and FIG.10 through FIG.13. The mis-insert preventing mechanism comprises a lock lever 52, a roller 53, and a pin 54 of the driving device 2, and a lock-groove 3d and the corners 3f through 3i of the disk cartridge 1. One of the characteristics of the mis-insert preventing mechanism 38 according to the present invention is that the roller 53 holds the disk cartridge 1 inserted in the correct direction at the predetermined position, and blocks the disk cartridge 1 inserted in the wrong direction from being loaded into the predetermined position. The 15 lock-groove 3d is formed on the case 3 at the right side 3c shown in FIG. 2(A). The lock-groove 3d has an inclined plane 3e which is inclined to the eject direction (C2 direction). The corner 3f is chamferred with a larger radius than other corners 3g through 3i. The lock lever 52 is mounted on the side plate 20c pivotably around shafts 51. The roller 53 is located at the end of the locking lever 52, and can be engaged with the corner 3f and the lock-groove 3d. The roller 53, lock-groove 3d and corner 3f may be arranged differently from this embodiment as long as the roller 53 can be engaged with the lock-groove 3d and the corner 3f. The pin 54 slidably touches the pushing portion 39e of the eject lever 39. The lock lever 52 is forced pivotably in a direction $F_1$ by the tensile force of the coil spring 55 which is engaged with the base plate 20a at its end thereof. The shaft 51 and the lock lever 52 do not block the inserting of the disk cartridge 1, whereas the roller 53 is located to block the disk cartridge 1. When the disk cartridge 1 is inserted in the correct direction, the corner 3f pushes out the roller 53 in the direction $F_2$. The corner 3f is chamferred with a large radius, so a point where the corner 3f touches the roller 53 is far from the lock lever 52. Therefore, because of a moment counterclockwise around the shaft 51 generated by the above touching, the roller 53 can rotate in the direction $F_2$. When the disk cartridge 1 is inserted completely, the lock lever 52 pivots in the direction $F_1$ by the spring 55, and the roller 53 is engaged with the lock-groove 3d to hold the disk cartridge 1 in the holder 20. Because of the inclined plane 3e, the roller 53 is easily engaged with the lock-groove 3d. Thus, the disk cartridge 1 is fixed at the predetermined position, and is connected with the driving device 2 electrically. As shown in FIG. 11 and FIG. 13, the shafts 51 are located opposite to each other. As shown in FIG. 10 and FIG. 12, the disk cartridge 1 is ejected as follows. The eject button 2b is pushed, and the pushing portion 39e of the eject lever 39 pushes the pin 54. Then the lock lever 52 is pivoted in 20 the direction $F_2$ so that the roller 53 sets free the disk cartridge 1. When the disk cartridge 1 is inserted in the wrong direction, in other words, when one of the corners 3g through 3i touches the roller 53, the roller 53 cannot be pushed out in the direction $F_2$ because it is smaller chamferred than the corner 3f. Because a point where one of the corners 3g through 3i touches the roller 53 is so close to the lock lever 52 a moment sufficient to rotate the roller 53 in the direction $F_2$ is not generated by the touching. Therefore the disk cartridge 1 is prevented from being mis-inserted in the vicinity of the roller 53. Since the roller 53 also holds the disk cartridge 1 inside the driving device 2, the mis-insert preventing mechanism according to the present invention serves two functions, despite its being comprised of only a few members.

The on-off shutter mechanism is a mechanism for opening the shutter 12, which is usually closed for protecting the connector 11 from dust, only when the connector 11 is connected with the connector 29.

Before explaining the on-off shutter mechanism 25, operation of the shutter 12 of the disk cartridge 1 will be described below. Referring to FIG. 4(A), FIG. 4(B) and FIG. 4(C), the connector 11 is enclosed and protected from dust by the shutter 12. The shutter 12 can be slid in a direction B along the side of the case 3. The shutter is slid by mechanism of engagement between two tabs 12a of the shutter 12 and a groove 14. As shown in FIG. 4(C), the groove 14 is located under the lower case 3b about the connector 11. The groove 14 comprises a spring chamber 14a, a guide portion 14b and a concave portion 14c. A torsion spring 13 is accommodated in the spring chamber 14a. And the guide portion 14b guides the tabs 12a in the direction B. The two tabs 12a are coupled with the shutter 12, and both engage with the groove 14. One end of the spring 13 is engaged with a hook 12b, and the other end is engaged with a concave portion 14c. Therefore the shutter 12 is forced by the spring 13 in the direction $B_1$ when the shutter 12 is slid in the direction $B_2$. The force of the spring 13 in the direction B1 is not zero even when the shutter 12 is not slid so that the shutter 12 can always protect the connector 11 from dust.

Figure 15:
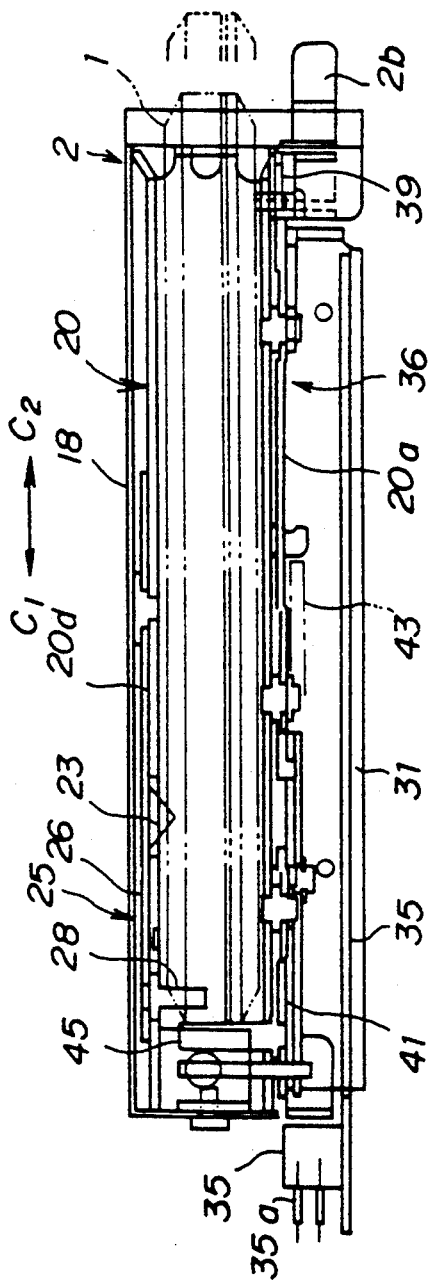
FIG. 15 is a cross-sectional view of a holder in which the disk cartridge is inserted.

Next, the on-off shutter mechanism 25 will be described in detailed with reference to FIG. 8, FIG. 14 and FIG. 15. The on-off shutter mechanism 25 comprises a pivot lever 26, a coil spring 27 and a pin 28. The pivot lever 26 is mounted pivotably around an axis $20e_1$ on the crown plate 20e. The coil spring 27 is engaged with a hole 26a in the pivot lever 26 at one end thereof, and is engaged with the crown plate 20d at the other end thereof. Therefore the pivot lever 26 is forced by the spring 27 in the direction $D_1$. The pin 28 projects into the holder 20 at the top of the pivot lever 26. When the disk cartridge 1 is inserted, the pin 28 is inserted into an indentation 15 of the disk cartridge 1, and is engaged with one end of the shutter 12. As the disk cartridge 1 is inserted, the pivot lever 26 pivots around the axis $20e_1$, and slides along a arc $20d_1$. A hook 26c which extends from a top end 26b of the pivot lever 26 holds the crown plate 20d with the top end 26b so that the pivot lever 26 can always slide along the arc $20d_1$. The pin 28 slides the shutter 12 in the direction $B_2$ as the pivot lever 26 pivots. When a cutout portion 12c of the shutter 12 comes to a position corresponding to the connector 11, the pin 28 is engaged with a slot 16 which is formed on the indentation 15 so that the shutter 12 is locked at an opening position. Thus the connector 11 can be connected with the connector 29 of the driving device 2.

The connector 29 is located on the base plate 20a, and the driving device is connected with a computer via connectors 34 and 35 with lots of connector pins 34a and 35a. The term "an opening position", as used herein, means a position where the connector 11 is laid bare. On the other hand, when the disk cartridge 1 is ejected, the shutter 12 is always locked at a closing position to protect the connector 11. Thus even when the disk cartridge 1 is ejected and carried, the case 3 is kept airtight. The term "a closing position", as used herein, means a position where the connector 11 is enclosed by the shutter 12.

The ejecting mechanism is a mechanism for ejecting the disk cartridge 1 which is inserted into the driving device 2. The eject mechanism 36 will be described with reference to FIG. 10, FIG. 12 and FIG. 15. As shown in FIG. 10, the eject mechanism 36 comprises the eject lever 39, an eject button 2b, a link 40 and a slider 41

The eject lever 39 has slits 39a through 39c, and pins 42 which are mounted on the base plate 20a are engaged along a direction (the direction C) in which the disk cartridge 1 is inserted and ejected, the eject lever 39 can slide in the direction C as long as the pins 42 can move in the slits 39a through 39c. FIG. 15 shows the configuration between the base plate 20a and the eject lever 39. The eject lever 39 is engaged with one end of a coil spring 43, Because the coil spring 43 is located in the direction $C_2$, the eject lever 39 is forced by the spring 43 in the direction $C_2$. The coil spring 43 forces the eject lever 39 in the direction $C_2$ opposite to an ejecting direction so that the disk cartridge 1 does not spring out as it does in the conventional ejecting mechanism. However, whether the coil spring 43 is attached or not is a matter of choice. The eject lever 39 has a cut out 39d which is engaged with the mis-eject prevent mechanism described later, and the pushing portion 39e which is engaged with the mis insert prevent mechanism 38 described above.

The eject button 2b is attached at the top of the eject lever 39. The eject button 2b can be projected or retracted according to the sliding of the eject lever 39. A direction of pushing the eject button 2b is in accordance with the ejecting direction (the direction $C_1$). As mentioned below, since a force proportional to a force by which the eject button 2b is pushed is communicated to the slider 41, unlike the conventional ejecting mechanism, the disk 4 and/or the heads 6a and 6b do not get damaged even if the disk cartridge 1 is ejected.

The link 40 is mounted pivotably around a shaft 40a which is supported between the eject lever 39 and the base plate 20a. The link 40 has pins 40b and 40c at the ends thereof respectively. The pin 40b is engaged with a hold 39f of the eject lever 39, and the pin 40c is engaged with a hole 41a of the slider 41. The link 40 is a member which communicates the force proportional to the pushing force of the eject button 2b to a slider 41.

The slider 41 is formed as a T-shape in the direction $C_1$. The slider 41 has slits 41b and 41c in the direction $C_1$. The slits 41b and 41c are engaged with pins 44 mounted on the base plate 20a. Therefore the slider 41 can slide in the direction C like the eject lever 39. The slider 41 has eject pins 45 and 46 at the right and left ends of the T-shape thereof. The eject pins 45 and 46 touch the end of the disk cartridge 1. The eject pins 45 and 46 eject the disk cartridge in response to the pushing of the eject button 2b. The eject pins 45 and 46 project into the holder 20 through the entrances $20a_1$ and $20a_2$ of the base plate 20a. The slider 41 is engaged with one end of a coil spring 47, the other end of which is engaged with the base plate 20a. The coil spring 47 is located in the direction $C_1$, and the slider 41 is forced by the spring 47 in the direction $C_1$ opposite to a direction in which the slider 41 is slid when it is ejecting the disk cartridge 1. Whether the coil spring 47 is attached or not is also a matter of choice.

When the eject button 2b is pushed, as shown in FIG. 12, the eject lever 39 is moved in the direction $C_1$, and the pin 40b is forced in the direction $C_1$. As a result, the link 40 pivots counterclockwise around the shaft 40a on the basis of the lever principle, and the pin 40c is forced in the direction $C_2$. Thus, the pin 40c moves the slider 41 in the direction $C_2$, and as shown in FIG. 19, the eject pins 45 and 46 push the end of the disk cartridge 1 to eject the same. After ejecting the disk cartridge 1, the eject lever 39 and the slider 41 are reset at the predetermined position respectively by means of tensile forces of springs 43 and 47. The coil springs 43 and 47 function as shock absorbers for absorbing a shock to be applied to the disk cartridge 1 even when the shock is applied to the eject button 2b.

Figure 16A:
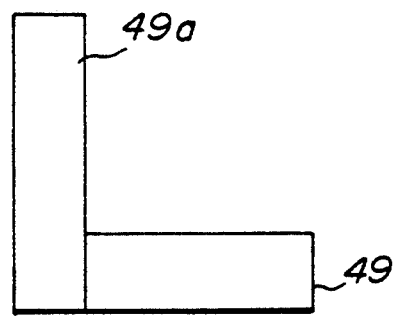
FIG. 16(A) and FIG. 16(B) are respectively a front view and a side view for explaining a projection.
Figure 16B:
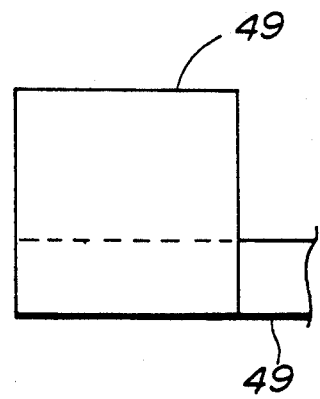

Lastly, the mis-eject preventing mechanism will be described below with reference to FIG. 10, FIG. 12 and FIG. 16. The mis-eject preventing mechanism is a mechanism for preventing the disk cartridge 1 from being ejected during recording or reproducing. The mis-eject preventing mechanism 37 comprises a lever 49 and a solenoid 50 which pivots the lever 49. The lever 49 is mounted pivotably around a shaft 48 which is supported on the base plate 20a. The lever 49 has a projection 49a at one end thereof, and is engaged with a plunger 50a of the solenoid 50 at the other end thereof. The projection extends upward so that tne eject lever 39 can be moved in the direction $C_1$ and the disk cartridge 1 can be ejected only when the projection is engaged with the cut out 39d of the eject lever 39. The projection 49a is formed like a rectangular plate as shown in FIG. 16(A) and FIG. 16(B), however it may be formed as other figures as long as it touches the ejecting lever when it is not engaged with the cut out 39d. The solenoid 50 is magnetized while the heads 6a and 6b are located on tracks on the disk 4, and is erased magnetically while the heads 6a and 6b are located at the waiting position. Therefore while the heads 6a and 6b record or reproduce, the solinoid 50 is magnetized, and the lever 49 is pivoted in the direction $E_2$. Consequently the eject lever 39 touches the projection 49a and the disk cartridge 1 cannot be ejected. However when recording or reproducing is over, the heads 6a and 6b are moved to the waiting position, so the solenoid 50 is erased magnetically. Consequently, as shown in FIG. 12, the lever 49 is pivoted in the direction $E_2$, and the projection 49a is engaged with the cut out 39d to allow the disk cartridge 1 to be ejected.

Further, the present invention is not limited to these preferred embodiments, but various variations and modifications may be made without departing from the scope of the present invention.

What is claimed is:

1. A magnetic disk drive comprising:
   a disk cartridge; and
   a driving device, wherein said disk cartridge comprises;
   a magnetic disk, and a magnetic head for recording information on said magnetic disk and/or reproducing information therefrom, and wherein said driving device comprises;

a housing, a holder, accommodated in said housing, which said disk cartridge is inserted into and ejected from, a current supply source for supplying electricity to said disk cartridge in order to drive said magnetic disk and said magnetic head when said disk cartridge is inserted into said holder, a touching member slidably provided in said holder, between a first position and a second position, said touching member being at said first position before said disk cartridge is inserted, being at said second position after said disk cartridge is completely inserted, and being at said first position after said disk cartridge is ejected completely, an eject button projecting from a surface of said housing and mounted on an eject lever, said eject lever and button being movable between a third position and a fourth position, biasing means biasing of said eject lever and button into said third position and biasing said touching member into said first position, and communicating means for communicating a motion of said eject button to said touching member so that said touching member is at said first position when said eject button is at said third position and said touching member is at said second position when said eject button is at said fourth position, wherein when said eject button is moved from said third position to said fourth position, said touching member is moved from said first position to said second position so as to eject said disk cartridge, said biasing means absorbing any shock applied to said eject button.

2. A magnetic disk drive according to claim 1, wherein said holder is fixed in the housing.

3. A magnetic disk drive according to claim 1, wherein said driving device further comprises a shaft in said holder, said shaft standing in a direction vertical to a direction in which said disk cartridge is inserted, and said communicating means comprises a communicating member having an engaging part between both ends thereof to be engaged with said shaft, said communicating member being supported pivotably around said shaft at said engaging part, the force proportional to the force for moving said eject button being applied to said touching member on the basis of the lever principle in a direction approximately opposite to that in which said eject button is pushed.

4. A magnetic disk device according to claim 1, wherein said biasing means includes a first shock absorbing member in said holder, one end of which is engaged with said eject loever and the other end of which is engaged with said holder, said disk cartridge being ejected without receiving any shock even if the shock is applied to said eject button because of said shock absorbing member.

5. A magnetic disk device according to claim 4, wherein said first shock absorbing member is a coil spring which forces said eject lever and button in a direction opposite to a direction in which said eject button is pushed.

6. A magnetic disk device according to claim 1, wherein said biasing means includes a second shock absorbing member in said holder, one end of which is engaged with said touching member and the other end of which is engaged with said holder, said disk cartridge being ejected without receiving any shock even if the shock is applied to said eject button because of said shock absorbing member.

7. A magnetic disk device according to claim 6, wherein said second shock absorbing member is a coil spring which forces said touching member in a direction from the first position to said second position.

8. A magnetic disk drive according to claim 1, wherein said driving device further comprises an information processor for receiving and/or transmitting the information recorded and/or reproduced by said magnetic head.

9. A magnetic disk drive according to claim 8, wherein said driving device further, comprises a controller for controlling said driving of said magnetic disk and/or the magnetic head.

* * * * *